United States Patent
Theopold et al.

(10) Patent No.: US 9,906,058 B2
(45) Date of Patent: Feb. 27, 2018

(54) METHOD FOR CHARGING AN ELECTRIC EMERGENCY ENERGY STORAGE DEVICE

(71) Applicant: Moog Unna GmbH, Unna (DE)

(72) Inventors: Tobias Theopold, Dortmund (DE); Ray Opie, Orchard Park, NY (US); Björn Schreiner, Schwerte (DE)

(73) Assignee: Moog Unna GmbH, Unna (DE)

( * ) Notice: Subject to any disclaimer, the term of this patent is extended or adjusted under 35 U.S.C. 154(b) by 523 days.

(21) Appl. No.: 14/324,767

(22) Filed: Jul. 7, 2014

(65) Prior Publication Data

US 2015/0008883 A1    Jan. 8, 2015

(30) Foreign Application Priority Data

Jul. 8, 2013 (EP) .................................... 13175452

(51) Int. Cl.
*H02J 7/00* (2006.01)
*H01M 10/44* (2006.01)
(Continued)

(52) U.S. Cl.
CPC .......... *H02J 7/0057* (2013.01); *F03D 7/0224* (2013.01); *F03D 7/0264* (2013.01);
(Continued)

(58) Field of Classification Search
CPC ....... H02J 7/345; F03D 7/0224; F03D 7/0264
(Continued)

(56) References Cited

U.S. PATENT DOCUMENTS

| 2009/0024265 | A1* | 1/2009 | Kortschak | B60K 6/485 |
| | | | | 701/22 |
| 2011/0156657 | A1* | 6/2011 | Anderson | H01M 10/44 |
| | | | | 320/134 |
| 2013/0113440 | A1* | 5/2013 | Narita | H02K 11/0094 |
| | | | | 320/167 |

FOREIGN PATENT DOCUMENTS

| DE | 4238316 A1 | 5/1993 |
| DE | 10335575 A1 | 3/2005 |

(Continued)

OTHER PUBLICATIONS

European Patent Office Search Report (2 pages) dated Jan. 1, 2014.

*Primary Examiner* — David V Henze-Gongola
(74) *Attorney, Agent, or Firm* — Harter Secrest & Emery LLP

(57) ABSTRACT

A method for charging an electric emergency energy storage device (1) comprising the following steps: predicting the energy demand $E_B$ of the energy consumer (2), determining the capacitance C of the emergency energy storage device (1) and the internal resistance $R_i$ of the emergency energy storage device (1), calculating a charging voltage $U_L$, whereby the charging voltage $U_L$ is calculated in such a way that the energy $E_C$ stored in the emergency energy storage device (1) at this charging voltage $U_L$ is just enough to meet the predicted energy demand $E_B$, taking into account losses that occur, especially at the internal resistor $R_i$, and charging or discharging the emergency energy storage device (1) until the calculated charging voltage $U_L$ has been reached.

13 Claims, 1 Drawing Sheet

(51) Int. Cl.
    *H01M 10/46*     (2006.01)
    *F03D 7/02*     (2006.01)
    *H02J 7/04*     (2006.01)
    *H02J 7/34*     (2006.01)
    *H02J 9/06*     (2006.01)

(52) U.S. Cl.
    CPC .............. *H02J 7/007* (2013.01); *H02J 7/045* (2013.01); *H02J 7/345* (2013.01); *H02J 9/06* (2013.01); *H02J 2007/0095* (2013.01); *Y02B 10/72* (2013.01); *Y02E 10/723* (2013.01); *Y02E 10/766* (2013.01)

(58) Field of Classification Search
    USPC ......................................... 320/166–167, 101
    See application file for complete search history.

(56) References Cited

FOREIGN PATENT DOCUMENTS

| | | | |
|---|---|---|---|
| EP | 1247979 | A2 | 10/2002 |
| EP | 2550451 | A2 | 1/2013 |
| WO | 2011117293 | A2 | 9/2011 |

* cited by examiner

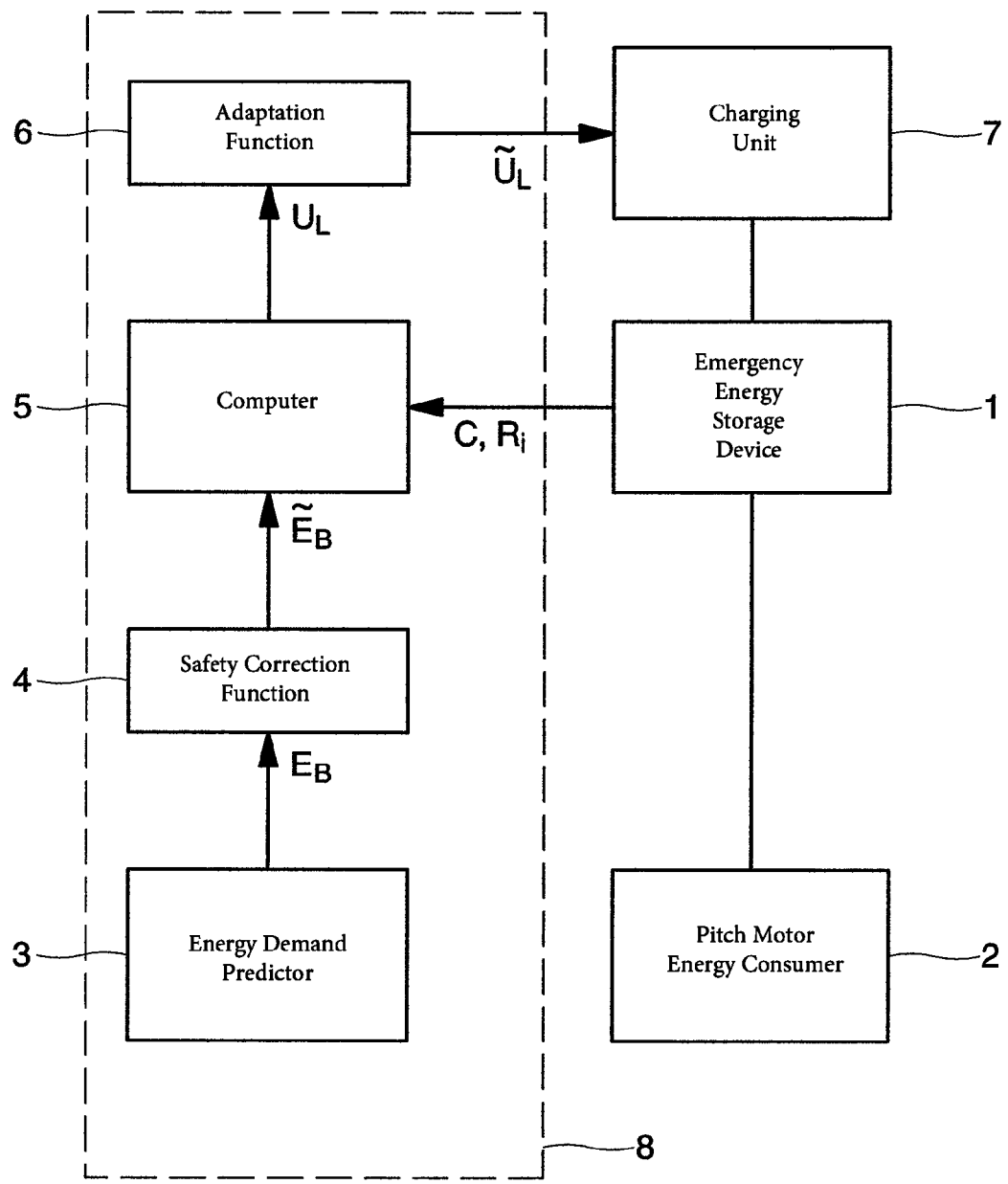

METHOD FOR CHARGING AN ELECTRIC EMERGENCY ENERGY STORAGE DEVICE

TECHNICAL FIELD

The invention relates to a method for charging an electric emergency power storage device of an energy consumer.

BACKGROUND ART

Emergency energy storage devices that supply electric energy to energy consumers find widespread use. As a rule, the energy consumers that need to be supplied with emergency power are safety-relevant. Examples of such safety-relevant energy consumers are especially motors in passenger elevators or the pitch system in wind turbines.

If the external power grid fails, as can happen, for example, in the case of a building fire, the elevators have to be able to proceed to the nearest floor and then the doors have to open without receiving power from the external power grid so that the persons present in the elevator can be brought to safety.

Modern wind turbines are normally provided with electric pitch systems that have at least one electric motor—referred to as a pitch motor—for each rotor blade. By rotating the rotor blades around their longitudinal axes, such pitch systems regulate the position of the rotor blades relative to the wind and they are often the only reliable way to bring the rotor of a wind turbine to a standstill. This is achieved in that the pitch system rotates the rotor blades into the so-called feathered position and the rotor comes to a standstill since it is no longer being driven by the wind. Energy is normally supplied to the pitch system by the power grid into which the wind turbine also feeds the power it has generated. Failure of the power grid can give rise to a hazardous situation, for example, if the winds pick up, since the rotational speed of the rotor of the wind turbine might exceed the maximum permissible value and cause damage to the wind turbine or injury to persons who are in the vicinity.

In order to prevent such a hazardous situation, even if the power grid fails, it must be possible to move the rotor blades into the feathering position, even when the external power grid is not supplying energy to the pitch system. Towards this end, pitch systems known from the state of the art are equipped with one or more emergency energy storage devices which, in case of a power grid failure, ensure that energy is supplied to the pitch system, thus guaranteeing the functionality of the pitch system, at least until the rotor blades have been moved into the safe feathering position.

One problem encountered when electric energy is provided by an emergency energy storage device is that, as a rule, such emergency energy storage devices undergo an ageing process. This means that, after a certain service life, the emergency energy storage devices no longer meet the same performance parameters as they did in the beginning.

In particular, the maximum amount of energy that can be stored in an emergency energy storage device decreases over the course of time. The voltage or the maximum output are also parameters that might be affected. The rate and extent of the ageing process are dependent, among other things, on the ambient temperature and on the voltage at which the emergency energy storage device is charged.

In order to meet the desired performance parameters until the end of a selected time span, that is to say, until the end of the service life of the emergency energy storage device, and thus to ensure, for instance, the safety of the wind turbine, the emergency energy storage devices known from the state of the art are dimensioned in such a way that the desired performance parameters are exceeded at the beginning of the selected time span to such an extent that the desired performance parameters are still met at the end of the selected time span, in spite of the decline caused by ageing. This necessary over-dimensioning of the emergency energy storage device raises the costs accordingly. When it comes to emergency energy storage devices in wind turbines, it is especially the performance parameters relating to the maximum storable amount of energy that are over-dimensioned. Moreover, during the operation of the wind turbine, the emergency energy storage device is charged in such a way that the maximum amount of energy that is possible at a given point in time is always stored in the emergency energy storage device. This is done in order to ensure that sufficient energy is stored in the emergency energy storage devices at all times.

Before this backdrop, the objective of the invention is to put forward a method for charging an emergency energy storage device that takes into account and minimizes the ageing of the emergency energy storage device.

BRIEF SUMMARY OF THE INVENTION

The above-mentioned envisaged and specified objective is achieved on the basis of the cited method for charging an emergency energy storage device (1) in that the method comprises the following steps: predicting the energy demand $E_B$ of the energy consumer (2), determining the capacitance C of the emergency energy storage device and the internal resistance $R_i$ of the emergency energy storage device, calculating a charging voltage $U_L$, whereby the charging voltage $U_L$ is calculated in such a way that the energy stored in the emergency energy storage device at this charging voltage $U_L$ is just enough to meet the predicted energy demand $E_B$, taking into account losses that occur, especially at the internal resistor $R_i$, and charging or discharging the emergency energy storage device until the calculated charging voltage $U_L$ has been reached.

In another aspect, the invention relates to a computer program product to carry out the method according to the invention. This computer program product can be, for instance, a computer program that is executed in a control unit of a pitch system, whereby the latter has the necessary means to carry out the method steps.

In detail, there is a wide array of possibilities to configure and refine the method according to the invention for charging an electric emergency energy storage device. For this purpose, reference is hereby made to the patent claims that are subordinated to claim 1 as well as to the detailed description below of preferred embodiments of the invention making reference to the drawing.

BRIEF DESCRIPTION OF THE DRAWING

FIG. 1 is a schematic of the sequence of a first embodiment of the invention.

DETAILED DESCRIPTION OF THE PREFERRED EMBODIMENTS

The predicted energy demand $E_B$ describes the energy that the energy consumer needs in order to perform the necessary work in case of an emergency situation such as, for example, a power failure.

In a simple case, the result of the prediction of the energy demand $E_B$ of the consumer can be an absolute amount of energy. The energy demand $E_B$ of the consumer can be predicted in different ways. For instance, the prediction can consist of assuming a constant value for the energy demand $E_B$. As an alternative, the prediction can be based on a model that, for example, assumes a linear increase in the energy demand $E_B$ as the emergency energy storage device or the energy consumer ages.

Moreover, the time span over which the energy demand $E_B$ extends in an emergency situation can be divided into at least two time segments, a process in which an absolute amount of energy is predicted for each of these time segments. The time span over which the energy demand $E_B$ extends can be divided into any desired number of time segments, whereby an absolute amount of energy is predicted for each time segment. In particular, the time segments can be infinitesimally short. In another configuration of the invention, the result of the prediction of the energy demand $E_B$ is an—especially continuous—function of the time which indicates the momentary energy demand $E_B$ at each point in time of the time span over which the energy demand $E_B$ extends.

The energy demand $E_B$ corresponds to the energy that the energy consumer needs in order to perform a defined task. In the example of an energy consumer in an elevator, the task consists of proceeding to the nearest floor and opening the doors without power being supplied by the external power grid. In a wind turbine, the task consists, for example, of rotating one or more rotor blades, particularly all of the rotor blades, into the feathering position without the external power supply stemming from the wind.

The capacitance C of the emergency energy storage device and the internal resistance $R_i$ of the emergency energy storage device can be determined in different ways. One method consists of briefly discharging the emergency energy storage device via a resistor and then measuring the voltage and the discharging current. On this basis, in turn, the capacitance C of the emergency energy storage device and the internal resistance $R_i$ of the emergency energy storage device can be calculated. An alternative method to determine the capacitance C of the emergency energy storage device and the internal resistance $R_i$ of the emergency energy storage device consists of employing a model to estimate the capacitance C of the emergency energy storage device and/or the internal resistance $R_i$ of the emergency energy storage device. Such a model can entail, for instance, the assumption that the capacitance C of the emergency energy storage device decreases linearly over the course of time and/or that the internal resistance $R_i$ of the emergency energy storage device increases linearly over the course of time. The complexity of such a model, however, can be considerably greater and can also take into consideration linear or non-linear influences of a wide array of parameters such as, for example, the number of charging/discharging cycles, the charging voltage $U_L$, the charging/discharging current, the temperature, etc. One model that takes the temperature into account, for example, on the basis of an earlier measured value for the capacitance $C_{-1}$ of the emergency energy storage device, can determine the momentary capacitance C of the emergency energy storage device in that the momentary capacitance C of the emergency energy storage device is calculated on the basis of a known relationship between the temperature T and the capacitance C(T). The term "C(T)" here means that the capacitance C is a function of the temperature T. Such a model can be analogously implemented for the internal resistance $R_i$ of the emergency energy storage device. The two last mentioned models require the temperature T to have been measured at the time of the earlier measurement of the capacitance $C_{-1}$ of the emergency energy storage device or at the time of the earlier measurement of the internal resistance $R_{i,-1}$ of the emergency energy storage device as well as at the time of the momentary determination of the capacitance C of the emergency energy storage device or of the internal resistance $R_i$ of the emergency energy storage device. The temperature of the emergency energy storage device as well as the temperature prevailing inside the housing containing the emergency energy storage device or else the ambient temperature can be employed as the temperature T. Moreover, the internal resistance $R_i$ of the emergency energy storage device can be determined by using a model while the capacitance C of the emergency energy storage device can be determined by a measurement or vice versa.

A charging unit that supplies the charging voltage $U_L$ can be provided in order to charge the emergency energy storage device. For example, the charging unit can be in the form of a rectifier that rectifies the alternating current of a supply network into a direct current having a voltage that corresponds to the charging voltage $U_L$.

If the calculated charging voltage $U_L$ is less than the momentary voltage U of the emergency energy storage device, it is discharged. This can be done, for example, in that only the charging voltage $U_L$ is applied to the emergency energy storage device, which then reaches the desired charging voltage $U_L$ through self-discharging. Alternatively, the emergency energy storage device can also be actively discharged in that, for example, an external resistance is applied to the emergency energy storage device until the charging voltage $U_L$ is reached.

Since the charging voltage $U_L$ and thus the energy $E_C$ stored in the emergency energy storage device are adapted to the predicted energy demand $E_B$, a considerably longer service life is achieved for the emergency energy storage device.

Instead of charging the emergency energy storage device at the maximum charging voltage $U_{L,\ max}$ over its entire service life, the emergency energy storage device is only charged with the charging voltage $U_L$ needed at that particular moment, which, as a rule, is lower than the maximum charging voltage $U_{L,\ max}$. Since the charging voltage $U_L$ here is lower than that of the state of the art, the ageing processes that take place within the emergency energy storage device are slowed down since the ageing processes are dependent to a considerable extent on the magnitude of the charging voltage $U_L$. The increase in the service life achieved by means of the method according to the invention can also be utilized to dimension the emergency energy storage device smaller from the very start, that is to say, especially with a smaller capacitance C, which markedly lowers the costs of the emergency energy storage device.

According to an advantageous embodiment, the predicted energy demand $E_B$ is expressed as a load current curve l(t) and a load resistance $R_L$, or as a load current curve l(t) and a load voltage curve $\hat{U}(t)$, or as a load resistance $R_L$ and a load voltage curve $\hat{U}(t)$.

The energy demand $E_B$ can be calculated if two of the three variables $R_L$, l(t) and $\hat{U}(t)$ are known. In this context, the load resistance $R_L$ is the resistance with which the emergency energy storage device is charged in an emergency situation. In particular, the load resistance $R_L$ can also be time-dependent. The load current curve l(t) is the current that is drawn from the emergency energy storage device in an emergency situation. The load current curve l(t) typically changes continuously during an emergency situation and can also briefly acquire negative values under certain conditions.

The load voltage curve $\hat{U}(t)$ corresponds to the voltage of the emergency energy storage device while electric energy is being drawn from the emergency energy storage device in an emergency situation. The energy demand $E_B$ results as the time integral of the product from the load resistance $R_L$ and the square of the load current curve $l(t)$, or else as the time integral of the product from the load voltage curve $\hat{U}(t)$ and the load current curve $l(t)$, or else as the time integral of the quotient from the square of the load voltage curve $\hat{U}(t)$ and the load resistance $R_L$:

$$E_B = \int_{t_0}^{t_1} R_L I^2(t)dt = \int_{t_0}^{t_1} \hat{U}(t)I(t)dt = \int_{t_0}^{t_1} \frac{\hat{U}^2(t)}{R_L}dt$$

The limits of the integral are the starting point in time $t_0$—from which the energy consumer needs energy from the emergency energy storage device in an emergency situation—and the end point in time $t_1$—from which the energy consumer no longer needs energy from the emergency energy storage device. 100261 When energy is drawn from the emergency energy storage device, losses $E_V$ always occur that are due to the internal resistance $R_i$ of the emergency energy storage device. Consequently, the stored energy $E_C$ is equal to the sum of the losses $E_V$ and the available energy $E_L$:

$$E_C = E_V + E_L$$

The charging voltage $U_L$ is thus calculated in such a manner that the available energy $E_L$ corresponds to the energy demand $E_B$:

$$E_C - E_V = E_L \approx E_B$$

In an advantageous embodiment, the energy stored in the emergency energy storage device at the charging voltage $U_L$ is assumed to be the sum of the losses at the internal resistor $R_i$ of the emergency energy storage device at the load current curve $l(t)$ prescribed by the predicted energy demand $E_B$ plus the electric energy $E_L$ supplied by the emergency energy storage device at this load current curve $l(t)$.

In order to calculate the charging voltage $U_L$, it is assumed that the internal resistor $R_i$ is the only source of losses within the emergency energy storage device. In other words, it is assumed that the supplied electric energy $E_L$ results from the difference between the stored energy $E_C$ and the time integral of the product of the internal resistance $R_i$ and the square of the load current curve $l(t)$:

$$E_L = E_C - E_V = E_C - \int_{t_0}^{t_1} R_i I^2(t)dt$$

The limits of the integral, in turn, are the starting point in time $t_0$—from which the energy consumer needs power from the emergency energy storage device in an emergency situation—and the end point in time $t_1$—from which the energy consumer no longer needs power from the emergency energy storage device.

According to a particularly advantageous embodiment, the emergency energy storage device is a capacitor, especially a supercapacitor.

The term "capacitor" or "supercapacitor" as set forth below refers to one single capacitor cell as well as to a parallel connection and/or a series connection consisting of several capacitor cells. Therefore, in the case of several interconnected capacitor cells, the capacitance C of the capacitor designates the resulting total capacitance of the capacitor cells that are interconnected.

On the basis of the relationship between the energy $E_C$ stored in a capacitor at a charging voltage $U_L$ and the capacitance C of the capacitor $$E_C = \tfrac{1}{2}CU_L^2,$$

one obtains the following formula for determining the charging voltage:

$$U_L = \sqrt{\frac{2}{C}\left(E_B + \int_{t_0}^{t_1} R_i I^2(t)dt\right)}$$

The term "supercapacitor" comprises electrochemical capacitors that have a double-layer capacitance as well as a pseudocapacitance. Depending on which of the two capacitances is predominant, the supercapacitors are classified in one of three families. Supercapacitors in which the double-layer capacitance is predominant are referred to as electric double-layer capacitors (EDLC). Supercapacitors in which the pseudocapacitance predominates are referred to as pseudocapacitors. The term "hybrid capacitors" refers to supercapacitors in which the double-layer capacitance and the pseudocapacitance contribute approximately equally to the total capacitance C of the supercapacitor.

In a preferred embodiment, it is provided that, in the calculation of the charging voltage $U_L$ as the energy stored in the emergency energy storage device at the charging voltage $U_L$, only a partial energy $E_T$ is taken into account, whereby the partial energy $E_T$ is the amount of energy that corresponds to the difference between the energy stored in the capacitor at the charging voltage $U_L$ and the energy stored in the capacitor at the lower limit voltage $U_G$.

For technical reasons, some energy consumers can no longer draw energy from the capacitor if the voltage of the capacitor falls below a limit voltage $U_G$. For this reason, the amount of energy $E(U_G)$ that remains unused when the limit voltage $U_G$ is reached in the capacitor is not taken into consideration in the calculation of the charging voltage $U_L$, that is to say, the amount of energy $E(U_G)$ is subtracted from the energy $E(U_L)$ that is stored in the capacitor at the charging voltage $U_L$. Thus, the partial energy $E_T$ taken into account in the calculation of the charging voltage $U_L$ is:

$$E_T = E(U_L) - E(U_G) = \tfrac{1}{2}CU_L^2 - \tfrac{1}{2}CU_G^2$$

Consequently, the following modified formula is obtained for calculating the charging voltage:

$$U_L = \sqrt{U_G^2 + \frac{2}{C}\left(E_B + \int_{t_0}^{t_1} R_i I^2(t)dt\right)}$$

According to another preferred embodiment, it is provided that a safety correction function is added to the predicted energy demand $E_B$ and/or the predicted energy demand $E_B$ is multiplied by a safety correction function.

In order to ensure that the energy stored in the emergency energy storage device is sufficient to meet the predicted energy demand $E_B$ while taking into consideration losses that occur, especially at the internal resistor $R_i$, it is advantageous to adapt the predicted energy demand $E_B$ by means of a safety correction function. In particular, this adaptation increases the predicted energy demand $E_B$, which causes the calculated charging voltage $U_L$ to likewise turn out to be higher than without the adaptation of the predicted energy demand $E_B$ by means of the safety correction function. Since the predicted energy demand $E_B$ can be an absolute amount of energy as well as a function of the time, the safety correction function can likewise be expressed as an absolute value or as a time-dependent function.

Moreover, it is advantageous for the calculated charging voltage $U_L$ to be increased by a constant value and/or to be multiplied by a safety factor.

Instead of or in addition to the subsequent adaptation of the energy demand $E_B$, the charging voltage $U_L$ can also be adapted after it has been calculated. This adaptation likewise ensures that the energy $E_C$ stored in the emergency energy storage device is sufficient to meet the predicted energy demand $E_B$, taking into account losses that occur, especially at the internal resistor $R_i$.

According to a preferred embodiment, a load measurement is carried out and the predicted energy demand $E_B$ is at least partially based on the results of the load measurement.

In this case, the term "load measurement" refers to the measurement of the energy drawn from the emergency energy storage device during an emergency situation or during normal operation of the energy consumer. This load measurement makes it possible to more precisely estimate the energy demand $E_B$ for a future emergency situation. The results of the load measurement are thus used to predict the energy demand $E_B$ of the energy consumer. In this context, the prediction of the energy demand $E_B$ can be based partially or else completely on the load measurement. In the latter case, it is therefore assumed that the energy demand $E_B$ of the energy consumer in a previous emergency situation essentially corresponds to the energy demand $E_B$ of the energy consumer in the next emergency situation.

In an advantageous embodiment, the energy consumer is an electric motor, especially a pitch motor.

The described method is particularly advantageous for energy consumers whose emergency energy storage devices are very labor-intensive to service or replace. This is especially the case for pitch systems in wind turbines, particularly in off-shore wind turbine systems.

According to another advantageous embodiment, a status signal is emitted as a function of the calculated charging voltage $U_L$ and/or of the predicted energy demand $E_B$ and/or of the determined capacitance C and/or of the determined internal resistance $R_i$.

A status signal can be, for example, an electric signal containing information about the calculated charging voltage $U_L$. This information can be the calculated charging voltage $U_L$ itself or else it can be information indicating that the calculated charging voltage $U_L$ falls within a certain value range. The signal can also be optical, that is to say, of an electromagnetic nature, or acoustic such as, for example, an acoustic warning signal. The emitting of several status signals of a different nature also fall within the scope of the invention.

In one particularly advantageous embodiment, a first status signal is emitted when the calculated charging voltage $U_L$ is not greater than a first limit value. The first limit value can be, for instance, a value below which it can be assumed that the emergency energy storage device is operating normally, that is to say, that it can fulfill its intended function.

In one advantageous embodiment, a second status signal is emitted when the calculated charging voltage $U_L$ is greater than a first limit value and not greater than a second limit value. In particular, the second status signal can contain information indicating that, even though the emergency energy storage device is functioning normally, it will have to be serviced within a certain period of time in order to retain its functionality.

According to another advantageous embodiment, a third status signal is emitted when the calculated charging voltage $U_L$ is greater than a second limit value and not greater than a third limit value. In particular, the third status signal can contain information indicating that, even though the emergency energy storage device is still functioning normally, failure of the emergency energy storage device is imminent, that is to say, the emergency energy storage device has to be repaired and/or replaced.

In another advantageous embodiment, a fourth status signal is emitted when the calculated charging voltage $U_L$ is greater than a third limit value, whereby the third limit value is a maximum permissible charging voltage $U_{L,\,max}$. The fourth status signal indicates that the emergency energy storage device is not capable of fulfilling its intended function since, even at the maximum permissible charging voltage $U_{L,\,max}$, the energy $E_C$ stored in the emergency energy storage device is not sufficient to meet the predicted energy demand $E_B$, taking into account losses that occur, especially at the internal resistor $R_i$.

According to a preferred embodiment, if the calculated charging voltage $U_L$ is greater than a maximum permissible charging voltage $U_{L,\,max}$, the calculated charging voltage $U_L$ is reduced to the maximum permissible charging voltage $U_{L,\,max}$. Consequently, if the calculated charging voltage $U_L$ is greater than the maximum permissible charging voltage $U_{L,\,max}$, the emergency energy storage device is not charged with the originally calculated charging voltage $U_L$, but rather only with the maximum permissible charging voltage $U_{L,\,max}$. This is a protective function aimed at protecting the emergency energy storage device from excessively high voltages that might damage or even destroy the emergency energy storage device.

FIG. 1 shows an emergency energy storage device 1 and an energy consumer 2, whereby the emergency energy storage device 1 takes over the supply of power to the energy consumer 2 in case of an emergency situation. In order to predict the energy demand $E_B$ of the energy consumer 2, a means 3 for predicting the energy demand $E_B$ of the energy consumer 2 is provided. The energy demand $E_B$ of the energy consumer 2 predicted by the means 3 for predicting the energy demand $E_B$ of the energy consumer 2 is adapted by means of a safety correction function 4 and the adapted energy demand $\tilde{E}_B$ is then fed to a computing means 5. Moreover, the computing means 5 receives the capacitance C of the emergency energy storage device and the internal resistance $R_i$ of the emergency energy storage device, both of which had been determined previously. On the basis of the adapted energy demand $\tilde{E}_B$, of the capacitance C of the emergency energy storage device and of the internal resistance $R_i$ of the emergency energy storage device, the computing means 5 calculates a charging voltage $U_L$, whereby the charging voltage $U_L$ is calculated in such a way that the energy $E_C$ stored in the emergency energy storage device at this charging voltage $U_L$ is just enough to meet the adapted energy demand $\tilde{E}_B$, taking into account losses that occur, especially at the internal resistor $R_i$.

By means of an adaptation means 6, the charging voltage $U_L$ calculated by the computing means 5 is increased by a constant value and/or multiplied by a safety factor. The result of this adaptation is the adapted charging voltage $\tilde{U}_L$. The adapted charging voltage $\tilde{U}_L$ is reported to a charging unit 7, in response to which the charging unit 7 either charges or discharges the emergency energy storage device until the adapted charging voltage $\tilde{U}_L$ has been reached.

The means 3 for predicting the energy demand $E_B$ of the energy consumer 2, the safety correction function 4, the computing means 5 and the adaptation means 6 are preferably configured in the form of software that runs in a control unit 8. The control unit 8 can be configured, for example, as a memory-programmable control unit of a pitch system of a wind turbine.

It should be noted that these routines may be practiced with other computer system configurations, including internet appliances, hand-held devices, wearable computers, multi-processor systems, programmable consumer electronics, network PCs, mainframe computers and the like. The system can be embodied in any form of computer-readable medium or a special purpose computer or data processor that is programmed, configured or constructed to perform the subject instructions. The term computer or processor as used herein refers to any of the above devices as well as any other data processor. Some examples of processors are microprocessors, microcontrollers, CPUs, PICs, PLCs, PCs or microcomputers. A computer-readable medium comprises a medium configured to store or transport computer readable code, or in which computer readable code may be embedded. Some examples of computer-readable medium are CD-ROM disks, ROM cards, floppy disks, flash ROMS, RAM, nonvolatile ROM, magnetic tapes, computer hard drives, conventional hard disks, and servers on a network. The computer systems described above are for purposes of example only. An embodiment of the invention may be implemented in any type of computer system or programming or processing environment. In addition, it is meant to encompass processing that is performed in a distributed computing environment, were tasks or modules are performed by more than one processing device or by remote processing devices that are run through a communications network, such as a local area network, a wide area network or the internet. Thus, the term program and processor are to be interpreted expansively.

The invention claimed is:

1. A method for charging a supercapacitor of an electric emergency energy storage device of a pitch drive of a wind turbine, comprising the following steps:
    predicting an energy demand $E_B$ of the pitch drive;
    determining a capacitance C of the supercapacitor and an internal resistance $R_i$ of the supercapacitor;
    calculating a charging voltage $U_L$, wherein the charging voltage $U_L$ is calculated in such a way that an energy loss $E_V$, being an amount of energy loss due to the determined internal resistance $R_i$, combined with a partial energy $E_T$, being an amount of energy that corresponds to the difference between the energy $E_C$ stored in the supercapacitor at the charging voltage $U_L$ and the energy stored in the supercapacitor at a lower limit voltage $U_G$, is substantially equal to the predicted energy demand $E_B$; and
    charging or discharging the supercapacitor until the calculated charging voltage $U_L$ has been reached.

2. The method for charging an electric emergency energy storage device according to claim 1, wherein the predicted energy demand $E_B$ is expressed as a load current curve l(t) and a load resistance $R_L$, or as a load current curve l(t) and a load voltage curve Ů(t), or as a load resistance $R_L$ and a load voltage curve Ů(t).

3. The method for charging an electric emergency energy storage device according to claim 2, wherein the energy $E_C$ stored in the supercapacitor at the charging voltage $U_L$ is assumed to be the sum of the losses due to the internal resistance $R_i$ of the supercapacitor at the load current curve l(t) prescribed by the predicted energy demand $E_B$ plus the electric energy supplied by the supercapacitor at the load current curve l(t).

4. The method for charging an electric emergency energy storage device according to claim 1, wherein a safety correction function is added to the predicted energy demand $E_B$ and/or the predicted energy demand $E_B$ is multiplied by a safety correction function.

5. The method for charging an electric emergency energy storage device according to claim 1, wherein the calculated charging voltage $U_L$ is increased by a constant value and/or multiplied by a safety factor.

6. The method for charging an electric emergency energy storage device according to claim 1, wherein a load measurement is carried out and the predicted energy demand $E_B$ is at least partially based on the results of the load measurement.

7. The method for charging an electric emergency energy storage device according to claim 1, wherein a status signal is emitted as a function of the calculated charging voltage $U_L$, and/or of the predicted energy demand $E_B$, and/or of the determined capacitance C, and/or of the determined internal resistance $R_i$.

8. The method for charging an electric emergency energy storage device according to claim 7, wherein a first status signal is emitted when the calculated charging voltage $U_L$ is not greater than a first limit value.

9. The method for charging an electric emergency energy storage device according to claim 8, wherein a second status signal is emitted when the calculated charging voltage $U_L$ is greater than the first limit value and not greater than a second limit value.

10. The method for charging an electric emergency energy storage device according to claim 9, wherein a third status signal is emitted when the calculated charging voltage $U_L$ is greater than the second limit value and not greater than a third limit value.

11. The method for charging an electric emergency energy storage device according to claim 10, wherein a fourth status signal is emitted when the calculated charging voltage $U_L$ is greater than the third limit value and the third limit value is a maximum permissible charging voltage $U_{L,\,max}$.

12. The method for charging an electric emergency energy storage device according to claim 11, wherein, if the calculated charging voltage $U_L$ is greater than the maximum permissible charging voltage $U_{L,\,max}$, the calculated charging voltage $U_L$ is reduced to the maximum permissible charging voltage $U_{L,\,max}$.

13. A non-transitory computer readable storage medium with program instructions for carrying out a method according to claim 1.

* * * * *